United States Patent
Kim et al.

(10) Patent No.: US 6,183,664 B1
(45) Date of Patent: Feb. 6, 2001

(54) DEICING AND SNOW-REMOVING COMPOSITION, METHOD FOR PRODUCING THE SAME, AND USE THEREOF

(75) Inventors: Ki-Bum Kim, Pyoung Apt. 1105, 42/2, Bunji-2Ho, Kayang-dong, Dong-gu, Taejeon-kwangyokshi 300-090; Kyoung-Jong Lee, Taejon-kwangyokshi, both of (KR)

(73) Assignee: Ki-Bum Kim, Taejeon-Kwangyokski (KR)

( * ) Notice: Under 35 U.S.C. 154(b), the term of this patent shall be extended for 0 days.

(21) Appl. No.: 09/403,494

(22) PCT Filed: Apr. 24, 1998

(86) PCT No.: PCT/KR98/00098

§ 371 Date: Oct. 22, 1999

§ 102(e) Date: Oct. 22, 1999

(87) PCT Pub. No.: WO98/47978

PCT Pub. Date: Oct. 29, 1998

(30) Foreign Application Priority Data

Apr. 24, 1997 (KR) .................................. 97/15467

(51) Int. Cl.$^7$ ........................................ C09K 3/18
(52) U.S. Cl. ................................. 252/70; 106/13
(58) Field of Search ................................ 252/70; 106/13

(56) References Cited

U.S. PATENT DOCUMENTS

| | | | | |
|---|---|---|---|---|
| 4,338,359 | * | 7/1982 | Kestner | 427/230 |
| 4,430,240 | * | 2/1984 | Sandvig et al. | 252/70 |
| 4,824,588 | * | 4/1989 | Lin | 252/70 |

FOREIGN PATENT DOCUMENTS

1658389 * 10/1973 (DE) .

* cited by examiner

*Primary Examiner*—Anthony Green

(57) ABSTRACT

A deicing and snow-removing composition, comprising 30 to 100 parts by weight of calcium oxide ($C_aO$), 5 to 30 parts by weight of magnesium chloride ($MgCl_2$), 3 to 10 parts by weight of calcium chloride ($CaCl_2$), and 0.2 to 2 parts by weight of sodium alginate. A method for preparing such a composition in which the above-mentioned ingredients are combined, gradually heated to 100° C. or higher, and then rapidly heated up to 200° C., and cooled at room temperature.

3 Claims, No Drawings

DEICING AND SNOW-REMOVING COMPOSITION, METHOD FOR PRODUCING THE SAME, AND USE THEREOF

TECHNICAL FIELD

The present invention relates to a deicing and snow-removing composition. More particularly, the present invention relates to a great improvement in preventing environmental pollution and vehicle corrosion as well as in deicing and snow-removing, along with the composition. Also, the present invention is concerned with a method for producing such a composition and a use of the same.

BACKGROUND ART

Currently, calcium chloride ($CaCl_2$) is one of the most widely used deicing and snow-removing agents. With the ability to melt ice and remove snow as well as having the advantage of low cost, calcium chloride is scattered on the roads which are iced or snowed over.

However, calcium chloride is problematic in application to a thick layer of ice or a heap of snow and in the chemical effect it has on iron. In other words, unless a large quantity of calcium chloride is scattered on the frozen or snow covered road in winter, a satisfactory thawing effect is not brought about because its deicing or snow-removing ability is insufficient. On the other hand, if a large quantity of calcium chloride is scattered, it is ionized so that the abundant chlorine ions thus formed combine with metal ions, especially with Ferric ion ($Fe^{+++}$) to produce $FeCl_3$, eroding iron structures on the roads, such as vehicles, or various road structures including bridges.

SUMMARY OF INVENTION

Therefore, it is an object of the present invention to overcome the above problems encountered in prior arts and to provide a deicing and snow-removing composition which can effectively melt or remove ice and snow on the roads without producing pollution of the environment and causing the corrosion of iron structures.

It is another object of the present invention to provide a method for preparing such a deicing and snow-removing composition.

In accordance with an embodiment of the present invention, there is provided a composition comprising 30 to 100 parts by weight of calcium oxide (CaO), 5 to 30 parts by weight of magnesium chloride ($MgCl_2$), 3 to 10 parts by weight of calcium chloride ($CaCl_2$), and 0.2 to 2 parts by weight of sodium alginate, and optionally sand and/or sawdust.

In accordance with another embodiment of the present invention, there is provided a method for preparing a deicing and snow-removing composition, in which a mixture comprising 30 to 100 parts by weight of calcium oxide (CaO), 5 to 30 parts by weight of magnesium chloride ($MgCl_2$), 3 to 10 parts by weight of calcium chloride ($CaCl_2$), and 0.2 to 2 parts by weight of sodium alginate are combined, gradually heated to 100° C. or higher and then rapidly heated up to 200° C., followed by cooling at room temperature.

DISCLOSURE OF INVENTION

The present invention utilizes an exothermial reaction to water, the heat of which allows the ice and snow over the roads to be thawed or removed. Calcium oxide (CaO) reacts with water to give calcium hydroxide, producing a heat, as shown in the following chemical formula:

$$CaO + H_2O \rightarrow Ca(OH)_2 + 15.2 \text{ kcal}$$

It was found that, when being in contact with snow or ice, calcium oxide can show a superior deicing and snow-removing effect in a short time by emitting a great heat.

An intensive study of the present inventors on a deicing and snow-removing composition resulted in the finding that magnesium chloride ($MgCl_2$), a highly hygroscopic compound, yields a synergic deicing and snow-removing effect, in cooperation with calcium oxide. Therefore, the present invention pertains to a deicing and snow-removing composition comprising calcium oxide and magnesium chloride in combination with other aids to thaw or melt ice and snow.

The temperature, after the composition of the present invention is scattered, although dependent on the scattered amount of the composition, reaches up to approximately 95–105° C., which is enough to show a superior deicing and snow-removing effect to that of conventional compositions.

Calcium hydroxide is used as a useful neutralizing agent for acidic soil. Hence, when the calcium hydroxide which remains on the road as a result of the reaction of calcium oxide with snow or ice, soaks through the soils near the road, such as arable lands, it may have beneficial influence on the neighboring circumstance by alkalifying the soils. In the composition of the present invention, calcium oxide is preferably contained at an amount of approximately 30 to 100 parts by weight. For example, if the content of calcium oxide is below 30 parts by weight, the deicing and snow-removing effect is not sufficiently brought about. On the other hand, if too much calcium oxide is used, there occurs a problem due to an excessive exothermic reaction.

As described above, magnesium chloride ($MgCl_2$) augments the deicing and snow-removing effect of calcium oxide owing to its hygroscopic property. It is preferred that ma,gnesium chloride ($MgCl_2$) amounts to approximately 5 to 30 parts by weight. For example, if too little magnesium chloride is used, an insufficient deicing and snow-removing effect results. On the other hand, if magnesium chloride is used at an amount larger than 30 parts by weight, it is ionized to form too much chlorine ions which cause the above-mentioned problem, that is, the corrosion of vehicles and bridges.

In the composition of the present invention, magnesium chloride hexahydrate ($MgCl_2 \cdot 6H_2O$) is usually used, but any kind of magnesium chloride, including dodecahydrate, octahydrate, tetrahydrate, bihydrate or anhydrate, may be used.

As for the aids to thaw or melt ice and snow, they comprise calcium chloride ($CaCl_2$) and sodium alginatte in accordance with the present invention.

Like magnesium chloride, calcium chloride is a highly hygroscopic compound, showing a synergic deicing and snow-removing effect, together with calcium oxide. Calcium chloride is preferably added at an amount of approximately 3 to 10 parts by weight. For example, if the content of calcium chloride is below 3 parts by weight, its deicing and snow-removing effect is not expressed. On the other hand, if the content of calcium chloride is above 10 parts by weight, an abundance of chlorine ion remains on the road, causing the aforementioned problems.

The calcium chloride of the composition of the present invention is usually present in the form of bihydrate ($CaCl_2 \cdot 2H_2O$) but may be of any form, such as anhydrate, monohydrate, tetrahydrate or hexahydrate.

Sodium alginate, a polysaccharide salt, is slowly dissolved in water to give a highly viscous liquid. Because this property has an effect of preventing ice from growing, the ice which is re-refrozen from the thawed water when the ambient temperature drops, is not made hard but crumbly.

It is preferred that sodium alginate is added at an amount of approximately 0.2 to 2 parts by weight. For example, if too little sodium alginate is used, the prevention effect against ice growth is very insignificant. On the other hand, if the content of sodium alginate exceeds 2 parts by weight, the composition get tangled owing to too high viscosity.

In accordance with another embodiment, sand is added at an amount of approximately 30 to 100 parts by weight to the composition, in order to increase the surface area of the deicing and snow-removing composition and to prevent vehicles from sliding. Another matter to increase the deicing and snow-removing effect of the composition, such as saw dust, may be used.

As described above, the components of the composition act synergistically and complementarily to show an excellent deicing and snow-removing effect. The water thawed by the composition of the present invention is seldom re-frozen to ice when the ambient temperature drops. If the thawed water is frozen, the ice thus formed is not hard but crumbly, so that the composition of the present invention is very effective to deice and remove snow even in the shade or on a road where there is little traffic.

When scattered at a proper amount on a region to be deiced or snow-removed, the composition exhibits an excellent deicing and snow-removing effect. Commonly, depending on the condition of the ice or snow, the amount of the composition scattered is determined, but the composition of the present invention from half as much as to as much as the conventional agent, calcium chloride, exhibits a far superior deicing and snow-removing effect.

The residues of the composition on the road are readily removed by wind or passing vehicles and do not produce pollution of the environment. Thus, the composition of the present invention does not cause the problems accompanied by the use of the conventional snow-removing chemicals.

Therefore, the present invention pertains to the use of the composition of the present invention in deicing and snow-removing.

Also, the present invention pertains to a method for preparing the deicing and snow-removing composition. A mixture comprising 30 to 100 parts by weight of calcium oxide (CaO), 5 to 30 parts by weight of magnesium chloride ($MgCl_2$), 3 to 10 parts by weight of calcium chloride ($CaCl_2$), and 0.2 to 2 parts by weight of sodium alginate are mixed, heated to 100° C. or higher and then rapidly up to 200° C., and cooled at the room temperature. Optionally, prior to the heating, sand and/sawdust may be added to the mixture at an amount of approximately 30 to 100 parts by weight, in order to increase the deicing and snow-removing effect.

A better understanding of the present invention may be obtained in light of following examples which ale set forth to illustrate, but are not to be construed to limit, the present invention

EXAMPLE I

Preparation of a Deicing and Snow-Removing Composition

To a mixture of 80 g of calcium oxide, 15 g of magnesium chloride hexahydrate, 5 g of calcium chloride bihydrate and 0.5 g of sodium alginate was added 200 g of sand. This mixture was completely mixed together, gradually heated up to 100° C. and then, rapidly heated up to 200° C., followed by cooling to 10° C. in the ambient atmosphere.

EXAMPLE II

Comparison of Deicing Effect

Two ice pieces (A and B), each having a dimension of 20 cm×20 cm×2 cm, were prepared. 500 g of the composition prepared in Example I and 500 g of $CaCl_2$ were scattered on the Sample Ice A and the Sample Ice B, respectively, and their deicing effects were compared and the results are given as shown in Table 1, below.

TABLE I

|  | Sample Ice A | Sample Ice B |
| --- | --- | --- |
| Deiced State | Completely molten to leave a small amount of water | molten on the surface only |
| Time for deicing | 10 min | 20 min |
| Temp. just after scatter | 98° C. | 36° C. |

COMPARATIVE EXAMPLE I

In order to clarify the characteristics of the invention, the composition (A') of the present invention according to example I and a conventional chemical (B') consisting mainly of calcium chloride were tested for chemical properties and snow-removing maintenance ability.

TABLE 2*

|  | A' | B' |
| --- | --- | --- |
| Temp. just after scatter | 95–105 C. | 35–40° C. |
| pH at 25° C. | 11–12 | 5–6 |
| Water Solubility (20° C.) | good (40–50 g/100 g) | very good (70–80 g/100 g) |
| **Residual chlorine ion | 1/10 | 1 |
| Upon Temp. drop after snow-removing | no ice or crumbly ice | hard ice reformed |

*the data listed in Table 2 may be changed depending on the scattering conditions including the amount of snow-removing chemical, weather, snowfall, ice state, etc.
**the amount of the residual chlorine ion of the present invention is relatively expressed on the basis of the amount of the conventional chemical.

The components in the composition of the present invention organically act to bring about a complement and synergic effect in deicing and snow-removing, so that the composition is far superior to the conventional chemicals in deicing and snow-removing effect. In addition, after being scattered, the composition of the present invention remains at an amount one-tenth smaller than the conventional chemical, $CaCl_2$ dose. This reduced amount avoids the problems accompanied by the conventional chemical, including corrosion of vehicles and bridges and pollution of the environment. What is better, the composition of the present invention is alkaline when it is dissolved in water, so that it has a beneficial influence on the soils near the region where it is scattered.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A deicing and snow-removing composition, comprising 30 to 100 parts by weight of calcium oxide (CaO), 5 to 30 parts by weight of magnesium chloride ($MgCl_2$), 3 to 10 parts by weight of calcium chloride ($CaCl_2$), and 0.2 to 2 parts by weight of sodium alginate.

2. A deicing and snow-removing composition in accordance with claim 1, further comprising approximately 30 to 100 parts by weight of sand.

3. A method for preparing a deicing and snow-removing composition, in which a mixture comprising 30 to 100 parts by weight of calcium oxide (CaO), 5 to 30 parts by weight of magnesium chloride ($MgCl_2$), 3 to 10 parts by weight of calcium chloride ($CaCl_2$), and 0.2 to 2 parts by weight of sodium alginite are combined, gradually heated to 100° C. or higher and then rapidly heated up to 200° C., and cooled at room temperature.

\* \* \* \* \*